3,247,061
SULFATHIADIAZOLE COMPOSITIONS AND
METHOD OF COMBATTING COCCIDIOSIS
Karl Pfister III, Westfield, N.J., assignor to Merck & Co.,
Inc., Rahway, N.J., a corporation of New Jersey
No Drawing. Filed Oct. 23, 1963, Ser. No. 318,178
3 Claims. (Cl. 167—53)

This invention relates generally to methods for the prevention and treatment of coccidiosis. In addition, it is concerned with novel anticoccidial compositions. More particularly, it relates to the combatting of coccidiosis with 3-sulfanilamido-1,2,5-thiadiazole and N-acyl derivatives thereof, and with novel compositions containing said substances.

Coccidiosis is a common and widespread poultry disease caused by species of protozoan parasites of the genus Eimeria, such as *E. tenella, E. necatrix, E. acervulina, E. maxima, E. hagani* and *E. brunetti. E. tenella* is the causative agent of a severe and often fatal infection of the caeca of chickens, which is manifested by severe and extensive hemorrhage, accumulation of blood in the caeca, and the passage of blood in the droppings. *E. necatrix* attacks the small intestine of the chick causing what is known as intestinal coccidiosis. Other intestinal species that cause serious disease are *E. brunetti, E. maxima* and *E. acervulina*. Related species of coccidia such as *E. meleagridis* and *E. adenoides* are causative organisms of coccidiosis in turkeys. When left untreated, the severe forms of coccidiosis lead to poor weight gain, reduced feed efficiency and high mortality in fowl. The elimination or control of this disease is, therefore, of paramount importance to the poultry raising industry.

In the past, various sulfa drugs have found acceptance as coccidiostats. Foremost among these is sulfaquinoxaline. In accordance with the present invention, anticoccidial compositions are provided wherein the active ingredient is a new sulfa drug which is significantly more active against poultry coccidiosis than sulfaquinoxaline or other previously used sulfa drugs.

I have now found that 3-sulfanilamido-1,2-5-thiadiazole is highly active against the protozoa which cause coccidiosis. As discussed more fully hereinbelow, the development of coccidiosis is prevented, and established infection cured, when small amounts of this substance are administered orally to poultry. One object of the present invention, therefore, is to provide a new method for preventing, controlling and treating coccidiosis. A further object is provision of novel compositions which, when added to the poultry feedstuff or drinking water, are extremely effective in preventing or curing coccidiosis. A still further object is provision of animal feedstuffs and drinking water formulation containing 3-sulfanilamino-1,2,5-thiadiazole or an N-acyl derivative thereof as an active anticoccidial agent. Other objects will become apparent from the following description of the invention.

3-sulfanilamino-1,2,5-thiadiazole has the structural formula

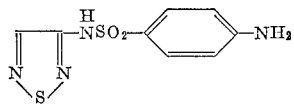

According to the present invention, it has been discovered that this material and the N⁴-acyl derivatives thereof are potent coccidiostats which may be successfully employed to prevent and/or cure coccidiosis when administered to poultry. The N⁴-acyl derivatives are represented by the formula

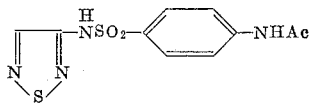

where Ac is preferably a lower alkanoyl radical such as acetyl, propionyl, butyroyl and the like. For convenience sake, reference is frequently made in the ensuing discussion only to the sulfathiadiazole itself, but such discussion is intended to apply also to the N⁴-lower alkanoyl derivatives.

The new coccidiostats of the invention are conveniently fed to poultry as a component of the feed of the animals although they may also be given dissolved or suspended in the drinking water. According to a preferred aspect of the invention, novel compositions for the treatment of coccidiosis are provided which comprise 3-sulfanilamido-1,2,5-triadiazole intimately dispersed in or intimately admixed with an inert edible carrier or diluent. By an inert edible carrier or diluent is meant one that is non-reactive with respect to the drug, and that may be administered with safety to the animals to be treated. The carrier or diluent is preferably one that is or may be an ingredient of the animal feed, and that has some degree of nutritive value for the animal.

Compositions which are an important feature of the invention are the so-called feed supplements in which 3-sulfanilamido-1,2,5-thiadiazole is present in relatively large amounts and which are suitable for addition to the poultry feed either directly or after an intermediate dilution or blending step. Examples of nutritive carriers or diluents suitable for such compositions are animal feed ingredients such as distillers' dried grains, corn meal, citrus meal, fermentation residues, ground oyster shells, wheat shorts, molasses solubles, corn cob meal, edible vegetable substances, toasted dehulled soya flour, soybean mill feed, antibiotic mycelia, soya grits, crushed limestone and the like. The thiadiazole compound is intimately dispersed or admixed throughout such solid carrier by techniques such as grinding, stirring, milling or tumbling. By selecting proper diluents and by altering the ratio of carrier to active ingredient, compositions of any desired concentration may be prepared. Formulations containing from about 2.5% to about 40% by weight, and preferably from about 10–30% by weight, of anticoccidial agent are particularly suitable for addition to poultry feedstuffs. The active compound is usually dispersed or mixed uniformly in the diluent but in some instances may be sorbed on the carrier. Since it is convenient for the feed manufacturer to use about one pound of feed supplement for each ton of finished feed, the preferred concentration in the supplement is frequently a function of the level of active ingredient desired in the finished feed.

Examples of poultry feed supplements prepared by intimately mixing 3-sulfanilamido-1,2,5-thiadiazole, or an acyl derivative thereof, with a nutritive, edible, solid diluent or diluents are:

A.

|  | Pounds |
|---|---|
| 3-sulfanilamido-1,2,5-thiadiazole | 25.0 |
| Wheat middlings | 75.0 |

B.
| | Pounds |
|---|---|
| 3-sulfanilamido-1,2,5-thiadiazole | 20.0 |
| Wheat shorts | 30.0 |
| Distillers' dried grains | 50.0 |

C.
| | |
|---|---|
| 3-sulfanilamido-1,2,5-thiadiazole | 25.0 |
| Amprolium | 25.0 |
| Corn distillers' dried grains | 50.0 |

D.
| | |
|---|---|
| 3-($N^4$-acetylsulfanilamido)-1,2,5-thiadiazole | 15.0 |
| Distillers' dried grains | 85.0 |

These supplements are made by mechanical milling or mixing of the ingredients to insure uniform distribution of the active compound.

Very low levels of 3-sulfanilamido-1,2,5-thiadiazole in the poultry feed are sufficient to afford the poultry good protection against coccidiosis. Preferably the compound is administered to chickens in an amount equal to about 0.003% to about 0.1% by weight of the daily feed intake. Optimum prophylactic results are obtained by feeding at a level of about 0.0075% to 0.05% by weight of the finshed feed. For therapeutic treatment of an established coccidial infection, higher amounts of 3-sulfanilamido-1,2,5-thiadiazole, i.e., up to about 0.1% by weight of the feed consumed, may be employed with good results. The most advantageous dosage level will, of course, vary somewhat with particular circumstances such as the type and severity of coccidial infection to be treated.

For treating poultry, the feed supplement is uniformly dispersed in the animal feed by suitable mixing or blending procedures. Usually the feed supplements are further diluted with materials such as corn meal or soybean meal before being incorporated in the animal feed. In this intermediate processing step the level of anti-coccidial agent in the carrier may be reduced to about 0.25%–1.0% by weight. This dilution serves to facilitate uniform distribution of the compound in the finished feed. The finished feed is one that contains a source of fat, protein, carbohydrate, minerals, vitamins and other nutritional factors.

In the above discussion of the invention, emphasis has been placed on solid compositions wherein the active ingredient is mixed with an edible carrier in a feed supplement, in a so-called premix or in the final poultry feedstuff. This is the preferred method of administering the thiadiazole of this invention for prophylactic use. An alternate method of treatment, and one that is highly satisfactory for treating established infection, is to dissolve or suspend the sulfathiadiazole compound in the drinking water of the poultry. The quantity of coccidiostat which may be administered in this fashion is, of course, limited by the solubility of the product in water or by the quantity that may be suspended in the water without undue settling. Emulsifiers or surface-active agents may be employed for this latter purpose. Administration via the drinking water has the advantage that very sick poultry will continue to drink water when they will no longer accept solid feed. The compound may be added directly to the drinking water, or alternatively, water soluble powders may be prepared in which the coccidiostat is admixed with a suitable water-soluble carrier such as sucrose or dextrose, and these powders added to the water. Such powders containing from about 0.5–20% by weight of active compound are quite suitable. It is also possible to increase the water solubility of the sulfathiadiazole by using it in the form of an alkali metal salt which may be added to the drinking water. Liquid formulations intended for addition to the drinking water may contain minor amounts of surfactants, solubilizers or suspending agents such as dimethylpolysiloxane, polyoxyethylene sorbitan monooleate and propylene glycol.

This invention is not limited to coccidiostat compositions having 3-sulfanilamido-1,2,5-thiadiazole as the sole active ingredient. Also contemplated within its scope is what might be called "combined treatment" where the thiadiazole and one or more other coccidiostats are administered concurrently. For such purposes, compositions may be prepared containing this compound admixed with one or more other coccidiostats such as sulfaquinoxaline, nicarbazin, ethopabate, 3,3'-dinitrodiphenyldisulfide, arsanilic acid, 3-amino-4-hydroxy-phenylarsonic acid, 5-nitrofurfural semicarbazone, 3,5-dinitrobenzamide, 2-methyl-3,5-dinitrobenzamide, amprolium, and the like.

It will be understood by those skilled in this art that special feed supplement formulations and finished animal feeds containing vitamins, antibiotics, growth-promoting agents and other nutritional substances may include the thiadiazole of this invention. A typical product of this type is the following—

| Ingredient: | Amount/lb. of Supplement, Grams |
|---|---|
| Riboflavin | 0.64 |
| DL-calcium pantothenate | 2.10 |
| Niacin | 3.67 |
| Choline chloride | 50.00 |
| Vitamin $B_{12}$ concentrate | [1] 1.30 |
| Procaine penicillin | 0.84 |
| Vitamin A (100,000 u./g.) | 3.38 |
| Vitamin $D_3$ (200,000 u./g.) | 0.68 |
| Arsanilic acid | 18.36 |
| Butylated hydroxy toluene | 23.15 |
| DL-methionine | 23.15 |
| 3-sulfanilamido-1,2,5-thiadiazole | 23.00 |
| Distillers' grains, to 1 pound | |

[1] Milligrams.

The following examples are given for purposes of illustration and not by way of limitation:

Example 1

Straight run White Leghorn chicks, in groups of three each, were weighed and placed in cages with wire floors. They were fed ad libitum a standard laboratory ration in which graded concentrations of 3-sulfanilamido-1,2,5-thiadiazole were blended just prior to use. Normal and infected control birds were fed basal rations containing no test compound. On the second day of the test the chicks (except normal controls) were inoculated orally with 200,000 sporulated oocysts of *E. acervulina*. On the sixth day after inoculation all surviving birds were sacrificed and weighed. The small intestines were pooled in water and homogenized in a blender. Two aliquots of the homogenate were placed in a hemocytometer and the oocysts counted. The following results were obtained:

| | Percent compound in feed | Percent weight gain | Millions of oocysts/ bird |
|---|---|---|---|
| Medicated Birds | 0.1 | 61 | 0 |
| | 0.05 | 70 | 0 |
| | 0.025 | 63 | 0 |
| | 0.0125 | 62 | 0 |
| Infected Controls | 0 | 58 | 26.5 |
| Normal Controls | 0 | 67 | 0 |

Example 2

Groups of ten two-week-old White Leghorn chicks were fed a mash diet containing various amounts of a 3-sulfanilamido-1,2,5-thiadiazole uniformly dispersed in the feed. After having been on this ration for 24 hours, each chick was orally inoculated with 100,000 sporulated oocysts of *E. maxima*. Other groups of ten chicks each were fed similar mash diet which contained no coccidiostat. Certain of these were infected in the same manner after 24 hours and served as positive or infected controls. Still other groups of ten chicks each were fed the mash free of coccidiostat and were not infected with coccidiosis. These served as normal controls. The diets were administered to the chicks for eight days following the date of infection. At the end of this time the birds still living were sacrificed and the intestines examined for lesions. The oocyst count was determined by a microscopic examination of intestinal homogenates. The following results, expressed as mean values, were obtained.

| Medication | Percent by wt. diet conc. | No. chicks | Percent wt. gain | Gross lesion score | Millions of oocysts/ bird |
|---|---|---|---|---|---|
| 3-sulfanilamido-1,2, 5-thiadiazole | 0.003 | 10 | 67 | 1.2 | 4.1 |
|  | 0.006 | 10 | 71 | 0.8 | 7.5 |
|  | 0.0125 | 10 | 84 | 0.5 | 2.6 |
|  | 0.025 | 10 | 85 | 0.2 | <0.1 |
| Infected Control |  | 30 | 71 | 0.6 | 39.0 |
| Normal Control |  | 20 | 87 |  |  |

*Example 3*

An experiment was carried out similar to that described in Example 2, except that the chicks were infected with 100,000 oocysts of *E. Brunetti*. The following results were obtained:

| Medication | Percent by wt. diet conc. | No. chicks | Percent wt. gain | Gross lesion score | Millions of oocysts/ bird |
|---|---|---|---|---|---|
| 3-sulfanilamido-1,2, 5-thiadiazole | 0.006 | 10 | 56 | 0.0 | 0.2 |
|  | 0.0125 | 10 | 68 | 0.0 | <0.1 |
|  | 0.025 | 10 | 85 | 0.0 | <0.1 |
| Infected Control |  | 30 | 38 | 0.0 | 6.9 |
| Normal Control |  | 20 | 80 | 0.0 |  |

*Example 4*

The 3-sulfanilamido-1,2,5-thiadiazole, and the $N^4$-acyl derivatives thereof, employed as coccidiostats in my invention, are conveniently obtained from 3-amino-1,2,5-thiadiazole which latter substance may be produced from 1,2,5-thiadiazole-3-carboxylic acid azide via the 3-benzyloxycarbonamido derivative.

In a 5-liter flask equipped with stirrer, reflux condenser and a trap to remove any moisture, is placed 356 g. of 1,2,5-thiadiazole-3-carboxylic acid azide, 270 g. of benzyl alcohol and 3.5 liters of benzene, and the mixture is stirred and refluxed for 6 hours. After cooling to 30° C., 500 cc. of petroleum ether is added and the mixture then is chilled overnight at 2–3° C. The crystals that separate are collected, washed with four 500 cc. portions of petroleum ether and then air dried at 50° C. yielding 483 g. of 3-benzyloxycarbonamido-1,2,5-thiadiazole, M.P. 133–134° C.

235 g. of 3-benzyloxycarbonamido-1,2,5-thiadiazole is placed in a 12-liter flask equipped with stirrer, thermometer, nitrogen inlet, and reflux condenser. 3500 cc. of concentrated hydrochloric acid is added followed by 150 cc. of ethanol, and the mixture then stirred gently and heated under nitrogen at such a rate that it required two hours to go from 60° C. to 80° C., then held at 80–85° C. for 2½ additional hours. (As considerable foaming occurs during the initial stage of the reaction, care should be taken not to stir the reaction mixture too vigorously or heat it too rapidly.) Following the heating of the reaction mixture, the mixture is chilled to 20° C. and the benzyl chloride removed by extracting with three 2 liter portions of ether. The aqueous layer is then concentrated in vacuo to dryness. The crystalline residue obtained is dissolved in 300 cc. of boiling alcohol containing a teaspoon of decolorizing charcoal. The mixture then is filtered and the residue washed with 50 cc. of boiling alcohol. The combined filtrates are cooled to −5° C. and the crystals that form are collected, washed with five 50 cc. portions of ether and air-dried at 50° C. to give 84.5 g. of 3-amino-1,2,5-thiadiazole hydrochloride, M.P. 160° C. (dec.). The product is purified by dissolving in 1900 ml. of warm ethanol adding 10 g. of decolorizing charcoal, filtering and washing the residue with 75 cc. of hot ethanol. The filtrates are combined and chilled to 0° C. The crystals that separate are collected, washed with three 100 cc. portions of ether and dried in vacuo. The purified material has a melting point of 164–165° C. (dec.).

83 g. of 3-amino-1,2,5-thiadiazole hydrochloride is dissolved in 250 cc. of water. 250 cc. of 34% sodium hydroxide is added and the precipitated base is extracted with one 500 cc. portion and two 250 cc. portions of ether. The combined ether extracts are dried over magnesium sulfate and the ether then removed by distillation at atmospheric pressure and using a short Vigreaux column, yielding 61 g. of 3-amino-1,2,5-thiadiazole as a mobile liquid.

61 g. of 3-amino-1,2,5-thiadiazole is dissolved in 600 cc. of dry pyridine and cooled to 10° C. To this solution is added in portions, while stirring, 140 g. of p-acetylaminobenzenesulfonyl chloride at 0–10° C., over a period of 1 hour, about 2.3 g. every minute. The reaction mixture is allowed to warm to room temperature, stirred at 40–45° C. for three hours, then allowed to stand at room temperature overnight. The reaction mixture is concentrated in vacuo to a syrup, 1 liter of water is added and the mixture acidified to pH 4.8 by adding 10 cc. glacial acetic acid. 3-($N^4$-acetylsulfanilamido)-1,2,5-thiadiazole crystallizes. The mixture is cooled to 2° C. and the crystals are collected, washed with six 50 cc. portions of ice water and dried in vacuo over sulfuric acid, to give 87.0 g. of 3-($N^4$-acetylsulfanilamido)-1,2,5-thiadiazole, M.P. 239–240° C.

60 g. of 3-($N^4$-acetylsulfanilamido)-1,2,5-thiadiazole is suspended in 600 cc. of alcohol, 300 cc. of concentrated hydrochloric acid is added and the mixture is refluxed on the steam bath for 2 hours. The reaction mixture is then concentrated in vacuo to a volume of 300 cc. whereupon heavy crystallization takes place. The mixture is cooled to 2–3° C., filtered, and the solid washed with ice water and air-dried at 50° C. to give 42.4 g. of 3-sulfanilamido-1,2,5-thiadiazole, M.P. 189–191° C. The product is purified by dissolving in 300 cc. of 10% ammonium hydroxide, adding a teaspoon of decolorizing charcoal, filtering and acidifying the colorless filtrate by the addition of 100 cc. of glacial acetic whereupon precipitation takes place at once. After cooling to 0° C. the crystals are collected on a filter, washed free from salts with ice water and dried at 50° C. to give substantially pure material, M.P. 198–199° C.

The 1,2,5-thiadiazole-3-carboxylic acid azide employed as starting material in the above reaction sequence is described in U.S. Patent No. 3,060,187.

3-sulfanilamido-1,2,5-thiadiazole, and the N-acyl derivatives thereof, are disclosed in U.S. Patent 3,066,147. Reference to the use of such compounds in combatting coccidiosis and compositions adapted to such treatment, appears in the descriptive portion of that issued patent.

Any departure from the above description which conforms to the present invention is intended to be included within the scope of the claims.

What is claimed is:

1. A composition useful against coccidiosis that comprises a poultry feedstuff having intimately dispersed therein from about 0.003% to about 0.1% by weight of 3-sulfanilamido-1,2,5-thiadiazole.

2. A composition of value in combatting coccidiosis that comprises a non-toxic nutritive carrier vehicle having distributed therein from about 2.5% to 40% by weight of 3-sulfanilamido-1,2,5-thiadiazole.

3. The method of combatting coccidiosis in poultry that comprises orally administering to poultry an anticoccidially effective quantity of 3-sulfanilamido-1,2,5-thiadiazole.

References Cited by the Examiner

UNITED STATES PATENTS 3,066,147   11/1962   Carmack _____ 260—306.8

JULIAN S. LEVITT, *Primary Examiner.*